United States Patent Office.

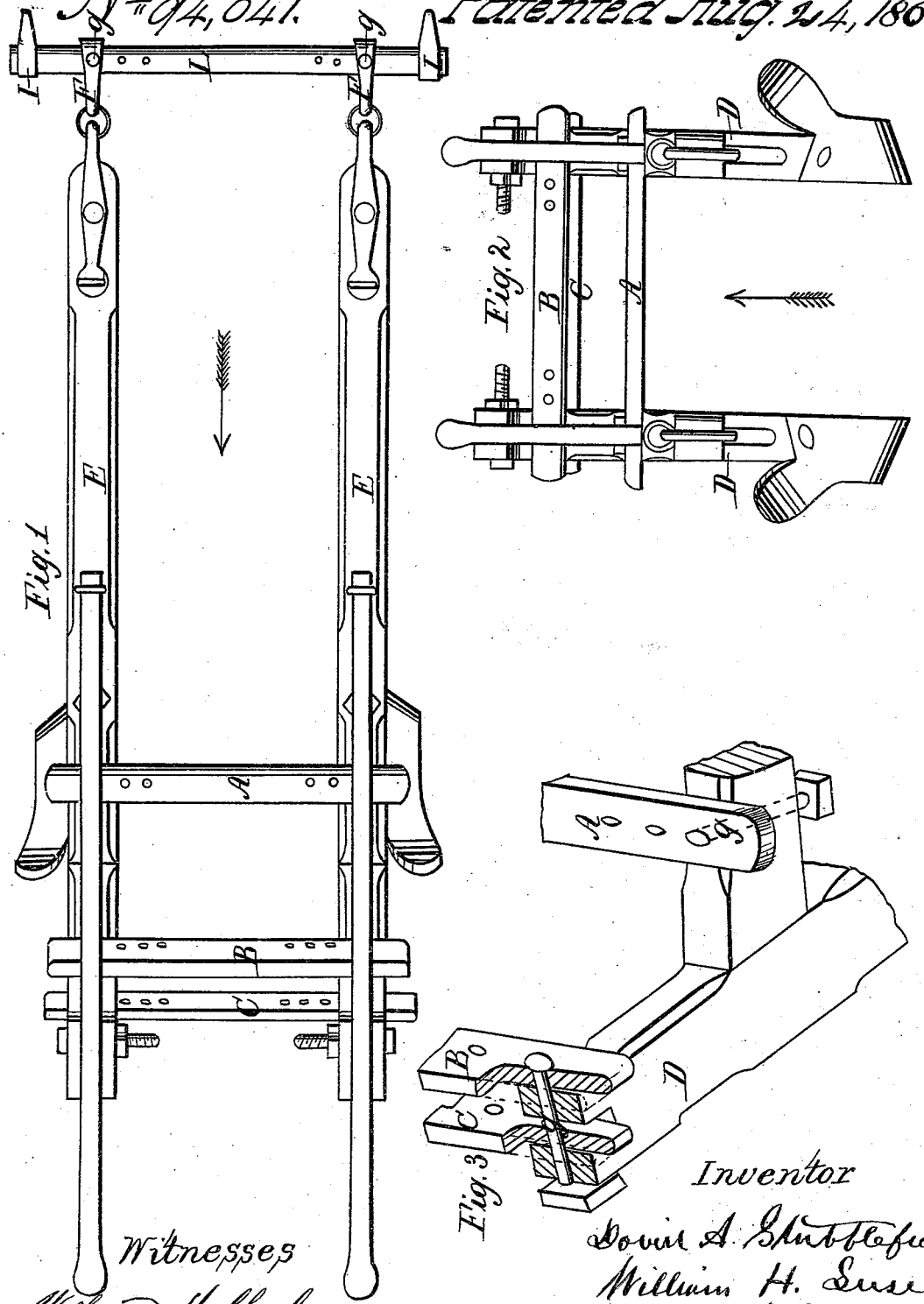

DAVID A. STUBBLEFIELD AND WILLIAM H. LUSE, OF YAZOO COUNTY, MISSISSIPPI.

Letters Patent No. 94,041, dated August 24, 1869.

IMPROVEMENT IN PLOWS.

The Schedule referred to in these Letters Patent and making part of the same.

*To all whom it may concern:*

Be it known that we, DAVID A. STUBBLEFIELD and WILLIAM H. LUSE, of the county of Yazoo, in the State of Mississippi, have invented a new and useful Improvement in Plows, or an improved mode of coupling plows; and do hereby declare that the following is a full, clear, and exact description thereof, reference being had to the accompanying drawings, making part of this specification, in which—

Figure 1 represents a top or plain view of our invention, and

Figure 2 is a front view of the same, looking toward the rear, as indicated by the arrows shown in both figures.

The nature of our invention consists in providing gang-plows with a series of perforated wooden or metallic bars for the purpose of adjustment, whereby the plows may be set at any required distance apart, for the purpose of turning the earth either to or from the corn or other growing crop, as desired.

To enable others skilled in the art to make and use our invention, we will proceed to describe the construction and operation.

We construct our plow in any of the known forms, with the exception, that we employ a series of perforated bars, as shown by A, B, and C, in the accompanying drawings. These bars and handles are secured to the standards by means of screw-bolts provided with nuts $a\ a\ a\ a$, shown in figs. 1, 2, and 3.

The standards D D are mortised to receive either end of the bar C, as clearly shown in the perspective view, Figure 3. The other two bars are bolted loosely on to the beams E E and standards D D.

The double-tree L is also provided with cuff-irons F F, so that the plow-beams may always be kept parallel distances apart.

The operation is so extremely simple that any farmer can readily adjust it to any required width, by simply removing the bolts $g\ g$ in bars B and C, and standards D D, and the bolts $g$ in bar A and beams E E, and the bolts $g\ g$ in cuff-irons F F. The working of the plow may be either expanded or contracted by merely adjusting the bolts $g\ g$ in bars A, B, and C, and bolts $g\ g$ in cuff-irons F F.

The plows are reversible from right to left, and *vice versa*, for barring off or bedding up. The coupling-bars and bolts may be made of wood or metal.

The coupling-bars A B C, and double-tree L, may have any number of holes in which to place the bolts $g$, in order to widen or narrow the working of the plow.

We do not claim, broadly, coupling plows, for that is old and well known; but

What we do claim, and desire to secure by Letters Patent, is—

The coupling-bars A, B, and C, standards D, beams E, and double-tree L, cuff-irons F, and bolts $g$, when the whole is combined, arranged, and operated substantially as for the purposes set forth.

In testimony that we claim the foregoing invention of a new and useful improvement in plows, or a new mode of coupling plows, we have hereunto set our hands, this 9th day of July, 1869.

W. H. LUSE.
D. A. STUBBLEFIELD.

Witnesses:
D. G. REED,
E. A. BOURG.